(12) United States Patent
Yamada et al.

(10) Patent No.: US 12,362,782 B2
(45) Date of Patent: Jul. 15, 2025

(54) SIGNAL PROCESSING APPARATUS AND SIGNAL PROCESSING METHOD

(71) Applicant: SONY GROUP CORPORATION, Tokyo (JP)

(72) Inventors: Takayuki Yamada, Tokyo (JP); Takayuki Oono, Tokyo (JP); Shuto Naruse, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 306 days.

(21) Appl. No.: 18/000,843

(22) PCT Filed: Jun. 1, 2021

(86) PCT No.: PCT/JP2021/020788
§ 371 (c)(1),
(2) Date: Dec. 6, 2022

(87) PCT Pub. No.: WO2021/256234
PCT Pub. Date: Dec. 23, 2021

(65) Prior Publication Data
US 2023/0216545 A1    Jul. 6, 2023

(30) Foreign Application Priority Data
Jun. 15, 2020  (JP) ................. 2020-103224

(51) Int. Cl.
*H04B 5/48*    (2024.01)
*H04B 1/12*    (2006.01)

(52) U.S. Cl.
CPC ............ *H04B 5/48* (2024.01); *H04B 1/12* (2013.01)

(58) Field of Classification Search
CPC ............................ H04B 5/48; H04B 1/12
See application file for complete search history.

(56) References Cited

U.S. PATENT DOCUMENTS

| | | | |
|---|---|---|---|
| 2002/0136231 A1* | 9/2002 | Leatherbury | H04L 12/2801 370/347 |
| 2008/0123779 A1* | 5/2008 | Norris | H04L 27/0012 375/326 |

(Continued)

FOREIGN PATENT DOCUMENTS

| | | |
|---|---|---|
| JP | 2001-127672 A | 5/2001 |
| JP | 2004-310583 A | 11/2004 |

(Continued)

OTHER PUBLICATIONS

International Search Report and Written Opinion of PCT Application No. PCT/JP2021/020788, issued on Aug. 31, 2021, 11 pages of ISRWO.

*Primary Examiner* — Junpeng Chen
(74) *Attorney, Agent, or Firm* — CHIP LAW GROUP

(57) ABSTRACT

The present technology relates to a signal processing apparatus, signal processing method, and program capable of extending a communication distance while reducing a signal delay in contactless communication.
The signal processing apparatus performs filter processing on a signal received from a reader/writer via a first antenna, and transmits the signal to a card serving as a contactless communication apparatus via a second antenna. Furthermore, the signal processing apparatus performs filter processing on a signal received from the card via the second antenna, and transmits the signal to the reader/writer via the first antenna. The present technology can be applied to a communication system using contactless communication.

13 Claims, 11 Drawing Sheets

(56) References Cited

U.S. PATENT DOCUMENTS

| | | | |
|---|---|---|---|
| 2008/0143488 A1* | 6/2008 | Yamamoto | G06K 19/07749 340/10.51 |
| 2011/0241837 A1* | 10/2011 | Suzuki | H01Q 1/2216 340/10.1 |
| 2017/0115672 A1* | 4/2017 | Gutierrez | H04B 3/542 |
| 2018/0136309 A1 | 5/2018 | Monte et al. | |
| 2019/0363452 A1* | 11/2019 | Ting | G02F 1/1313 |

FOREIGN PATENT DOCUMENTS

| | | |
|---|---|---|
| JP | 2008-153851 A | 7/2008 |
| JP | 2011-215865 A | 10/2011 |
| JP | 2018-182656 A | 11/2018 |

* cited by examiner

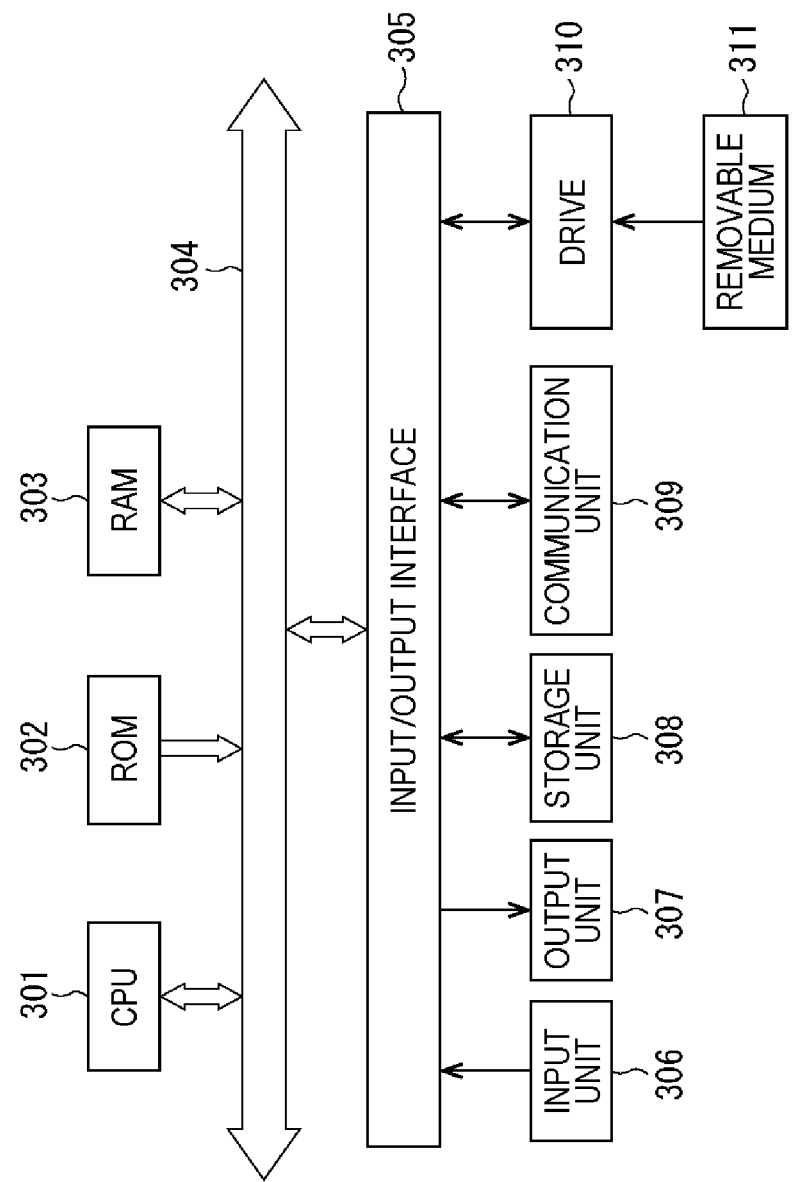

SIGNAL PROCESSING APPARATUS AND SIGNAL PROCESSING METHOD

CROSS REFERENCE TO RELATED APPLICATIONS

This application is a U.S. National Phase of International Patent Application No. PCT/JP2021/020788 filed on Jun. 1, 2021, which claims priority benefit of Japanese Patent Application No. JP 2020-103224 filed in the Japan Patent Office on Jun. 15, 2020. Each of the above-referenced applications is hereby incorporated herein by reference in its entirety.

TECHNICAL FIELD

The present technology relates to a signal processing apparatus, a signal processing method, and a program, and more particularly, to a signal processing apparatus, signal processing method, and program capable of extending a communication distance while reducing a signal delay in contactless communication.

BACKGROUND ART

Patent Document 1 discloses a technique related to an apparatus that amplifies a carrier (carrier wave) of contactless communication from a near-field communication (NFC) reader/writer (hereinafter referred to as R/W) to a card to extend a communication distance.

CITATION LIST

Patent Document

Patent Document 1: Japanese Patent Application Laid-Open No. 2011-215865

SUMMARY OF THE INVENTION

Problems to be Solved by the Invention

However, because the apparatus described in Patent Document 1 performs buffering and digital signal processing, it takes a long time for the card to receive a signal sent from the R/W and for the R/W to receive a response sent from the card.

The present technology has been developed in view of the above circumstances, and is to enable extension of a communication distance while reducing a signal delay in contactless communication.

Solutions to Problems

An information processing apparatus according to one aspect of the present technology includes a signal processing unit that performs first filter processing on a signal received from a reader/writer via a first antenna, transmits the signal to a contactless communication apparatus via a second antenna, performs second filter processing on a signal received from the contactless communication apparatus via the second antenna, and transmits the signal to the reader/writer via the first antenna.

In one aspect of the present technology, first filter processing is performed on a signal received from a reader/writer via a first antenna, and the signal is transmitted to a contactless communication apparatus via a second antenna. Then, second filter processing is performed on a signal received from the contactless communication apparatus via the second antenna, and the signal is transmitted to the reader/writer via the first antenna.

BRIEF DESCRIPTION OF DRAWINGS

FIG. 12 is a block diagram illustrating a configuration example of a computer.

MODE FOR CARRYING OUT THE INVENTION

Hereinafter, an embodiment for carrying out the present technology will be described. The description will be made in the following order.

1. Communication system
2. First use case
3. Second use case
4. Others

<1. Communication System>
(Configuration Example of Communication System)
FIG. 1 is a block diagram illustrating a configuration example of an embodiment of a communication system to which the present technology is applied.

Figure 1:
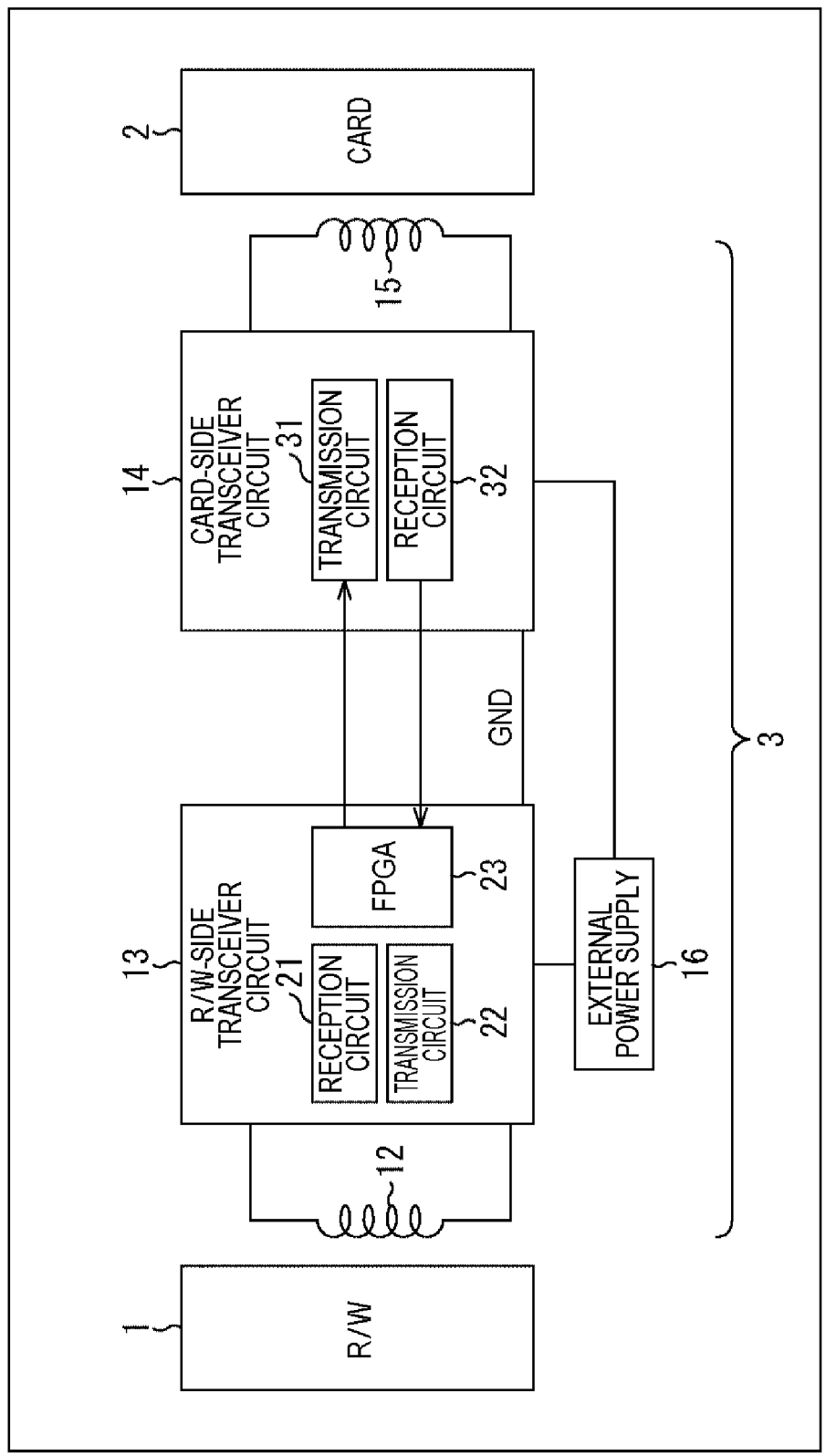
FIG. 1 is a block diagram illustrating a configuration example of an embodiment of a communication system to which the present technology is applied.

The communication system in FIG. 1 is a system for contactless communication between a reader/writer (R/W) 1 and a contactless communication apparatus such as a card 2. For the contactless communication, for example, as a carrier (carrier wave), near field communication (NFC) using a high-frequency magnetic field of a predetermined frequency (for example, 13.56 MHz, 4.915 MHz) as a medium is used.

In the communication system, a signal processing apparatus 3 is used between the R/W 1 and the card 2 in order to extend a communication distance.

The R/W 1 is incorporated in, for example, an automatic ticket gate apparatus, an automatic vending apparatus, a mobile terminal, a smartphone, or the like. The R/W 1 reads data from the card 2 or writes data into the card 2 by performing contactless communication with the card 2 via the signal processing apparatus 3.

Although not illustrated, the R/W 1 includes, for example, an antenna for contactless communication with the card 2 and the signal processing apparatus 3, and a radio frequency (RF) substrate connected to the antenna. The antenna is, for example, a loop antenna including a metal antenna coil.

The R/W 1 transmits a predetermined command (signal) to the signal processing apparatus 3 by performing contactless communication. Furthermore, with contactless communication, the R/W 1 receives, from the signal processing apparatus 3, a response (signal) of the card 2, the response corresponding to a command transmitted to the card 2.

The card 2 is a card-type contactless communication apparatus that can be carried by a user, and includes, for example, an integrated circuit (IC) card. Note that, although description will be given by using an IC card in the present specification, in addition to the IC card, for example, a contactless communication apparatus including various contactless communication functions such as a radio frequency identifier (RFID) tag, a mobile terminal, a game machine, an imaging device, and a personal computer can be used in the present technology.

Although not illustrated, for example, the card 2 includes, in a thin card exterior, an antenna for contactless communication with the R/W 1 and signal processing apparatus 3, and an IC chip equipped with an IC capable of executing predetermined calculation processing. Similarly to the antenna of the R/W 1, the antenna of the card 2 is, for example, a loop antenna including a metal antenna coil.

The card 2 receives a command of the R/W 1 from the signal processing apparatus 3 by performing contactless communication. Furthermore, with contactless communication, the card 2 transmits, to the signal processing apparatus 3, a response to the R/W 1, the response corresponding to the command.

The signal processing apparatus 3 includes an R/W-side antenna 12 (first antenna in the claims), an R/W-side transceiver circuit 13, a card-side transceiver circuit 14, a card-side antenna 15 (second antenna in the claims), and an external power supply 16.

The R/W-side antenna 12 is a first antenna (for example, an antenna on a side close to the R/W 1). Similarly to the antenna of the R/W 1, the R/W-side antenna 12 is, for example, a loop antenna including a metal antenna coil. The R/W-side antenna 12 receives a command transmitted from the R/W 1 and outputs the command to the R/W-side transceiver circuit 13. Furthermore, the R/W-side antenna 12 receives a response transmitted from the R/W-side transceiver circuit 13 and transmits the response to the R/W 1.

The R/W-side transceiver circuit 13 is a circuit that transmits and receives signals to and from the R/W 1 via the R/W-side antenna 12. The R/W-side transceiver circuit 13 includes a reception circuit 21, a transmission circuit 22, and a field-programmable gate array (FPGA) 23.

The reception circuit 21 receives, via the R/W-side antenna 12, the command supplied from the R/W-side antenna 12, and outputs the received command to the FPGA 23.

The FPGA 23 digitally processes the command supplied from the reception circuit 21 and transmits the digitally processed command to the card-side transceiver circuit 14. The digital processing includes signal determination processing of determining whether or not a signal, such as a command or a response, is a correct signal, and of filter processing including a gating processing of passing a signal determined to be correct and blocking other signals, and the like.

Furthermore, the FPGA 23 digitally processes the response transmitted from the card-side transceiver circuit 14 and outputs the digitally processed response to the transmission circuit 22.

The transmission circuit 22 transmits the response digitally processed by the FPGA 23 to the R/W 1 via the R/W-side antenna 12.

The card-side transceiver circuit 14 is a circuit that transmits and receives signals to and from the card 2 via the card-side antenna 15. The card-side transceiver circuit 14 includes a transmission circuit 31 and a reception circuit 32.

The transmission circuit 31 receives the command transmitted from the FPGA 23 and transmits the command to the card 2 via the card-side antenna 15.

The reception circuit 32 receives the response transmitted from the card 2 and transmits the response to the FPGA 23 via the card-side antenna 15.

The card-side antenna 15 is a second antenna (for example, an antenna on a side close to the card 2). Similarly to the antenna of the R/W 1, the card-side antenna 15 is, for example, a loop antenna including a metal antenna coil. The card-side antenna 15 transmits the command transmitted from the card-side transceiver circuit 14 to the card 2. The card-side antenna 15 receives the response transmitted from the card 2 and outputs the response to the card-side transceiver circuit 14.

The external power supply 16 supplies power to the R/W-side transceiver circuit 13 and the card-side transceiver circuit 14.

(Processing of Communication System)

Figure 2:
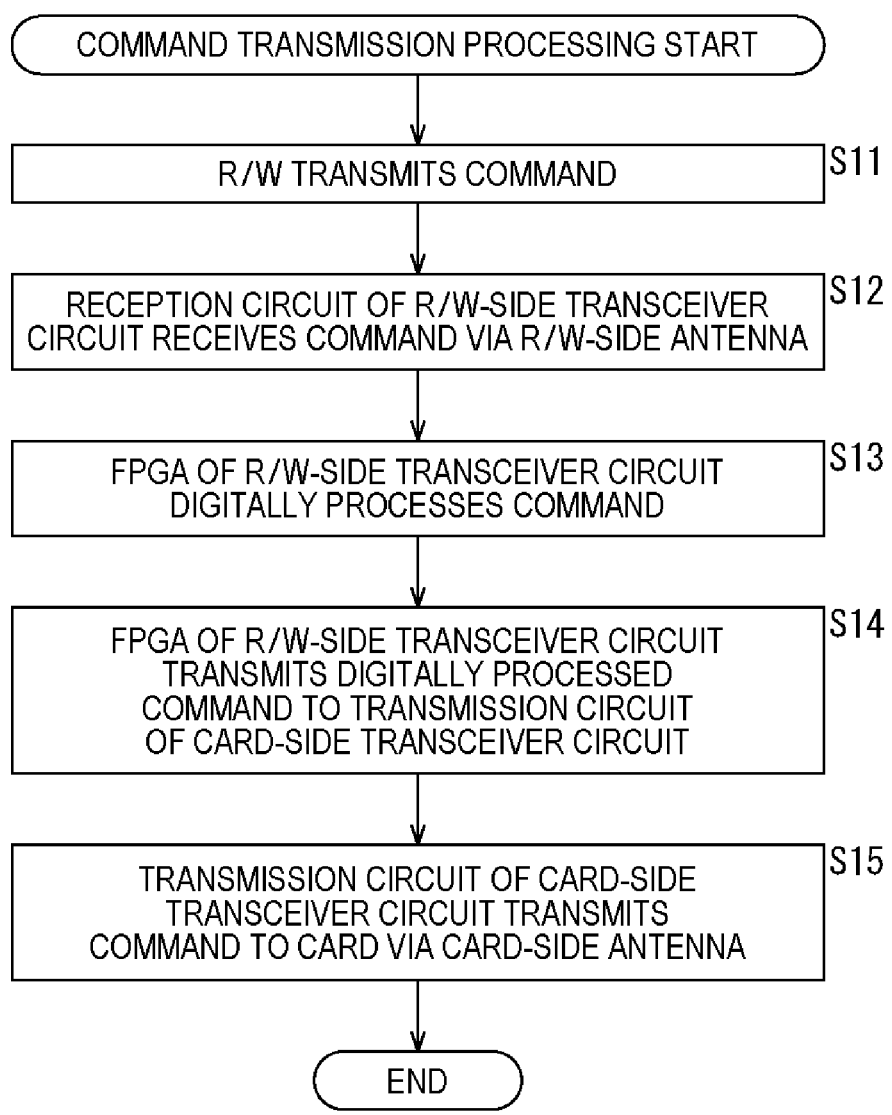
FIG. 2 is a flowchart describing command transmission processing of the communication system in FIG. 1.

FIG. 2 is a flowchart describing command transmission processing of the communication system in FIG. 1.

In Step S11, the R/W 1 transmits a command.

In Step S12, the reception circuit 21 of the R/W-side transceiver circuit 13 receives, via the R/W-side antenna 12, the command transmitted from the R/W 1. The reception circuit 21 of the R/W-side transceiver circuit 13 outputs the received command to the FPGA 23.

In Step S13, the FPGA 23 of the R/W-side transceiver circuit 13 digitally processes the command supplied from the reception circuit 21 of the R/W-side transceiver circuit 13.

In Step S14, the FPGA 23 of the R/W-side transceiver circuit 13 transmits the digitally processed command to the transmission circuit 31 of the card-side transceiver circuit 14.

In Step S15, the transmission circuit 31 of the card-side transceiver circuit 14 transmits, to the card 2 via the card-side antenna 15, the command received from the FPGA 23 of the R/W-side transceiver circuit 13.

Figure 3:
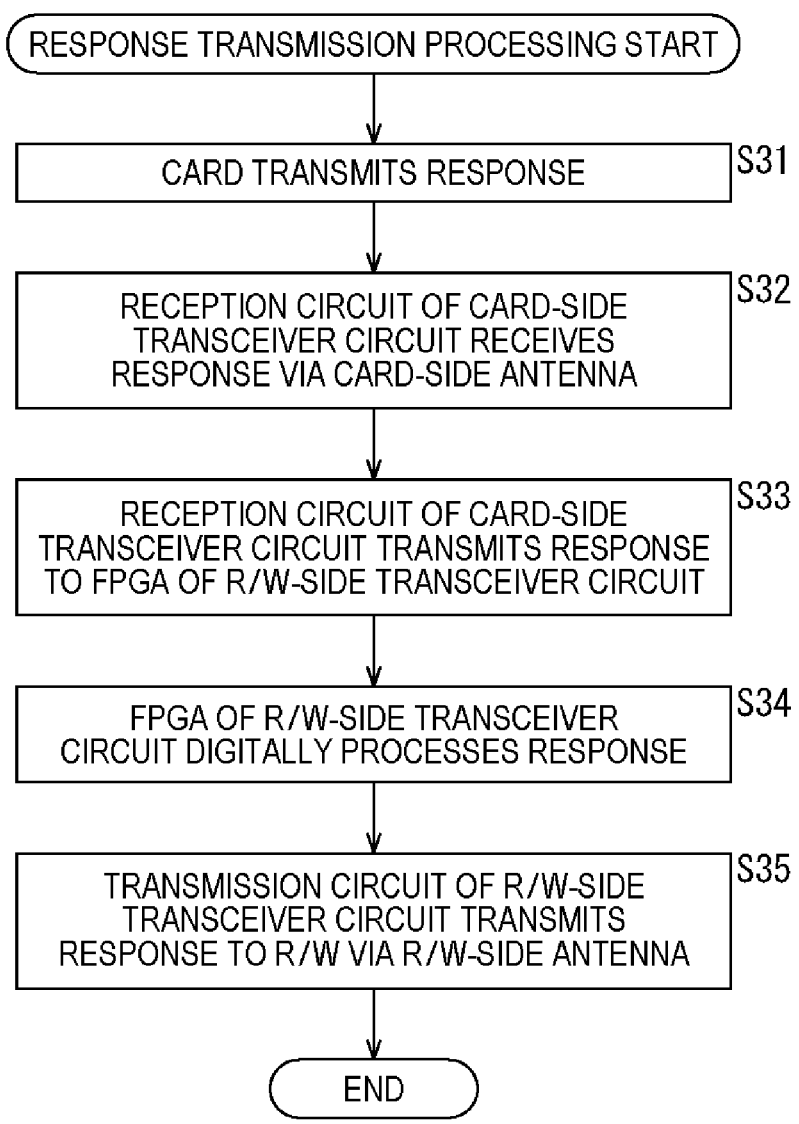
FIG. 3 is a flowchart describing response transmission processing of the communication system in FIG. 1.

FIG. 3 is a flowchart of response transmission processing of the communication system in FIG. 1.

In Step S31, the card 2 transmits, to the R/W 1, a response corresponding to the command transmitted from the R/W 1 via the signal processing apparatus 3.

In Step S32, the reception circuit 32 of the card-side transceiver circuit 14 receives, via the card-side antenna 15, the response transmitted from the card 2.

In Step S33, the reception circuit 32 of the card-side transceiver circuit 14 transmits the received response to the FPGA 23 of the R/W-side transceiver circuit 13.

In Step S34, the FPGA 23 of the R/W-side transceiver circuit 13 receives the response transmitted from the reception circuit 32 of the card-side transceiver circuit 14, and digitally processes the received response. The FPGA 23 of the R/W-side transceiver circuit 13 outputs the digitally processed response to the transmission circuit 22 of the R/W-side transceiver circuit 13.

In Step S35, the transmission circuit 22 of the R/W-side transceiver circuit 13 transmits, to the R/W 1 via the R/W-side antenna 12, the response supplied from the FPGA 23 of the R/W-side transceiver circuit 13.

(Configuration Example of FPGA)

Figure 4:
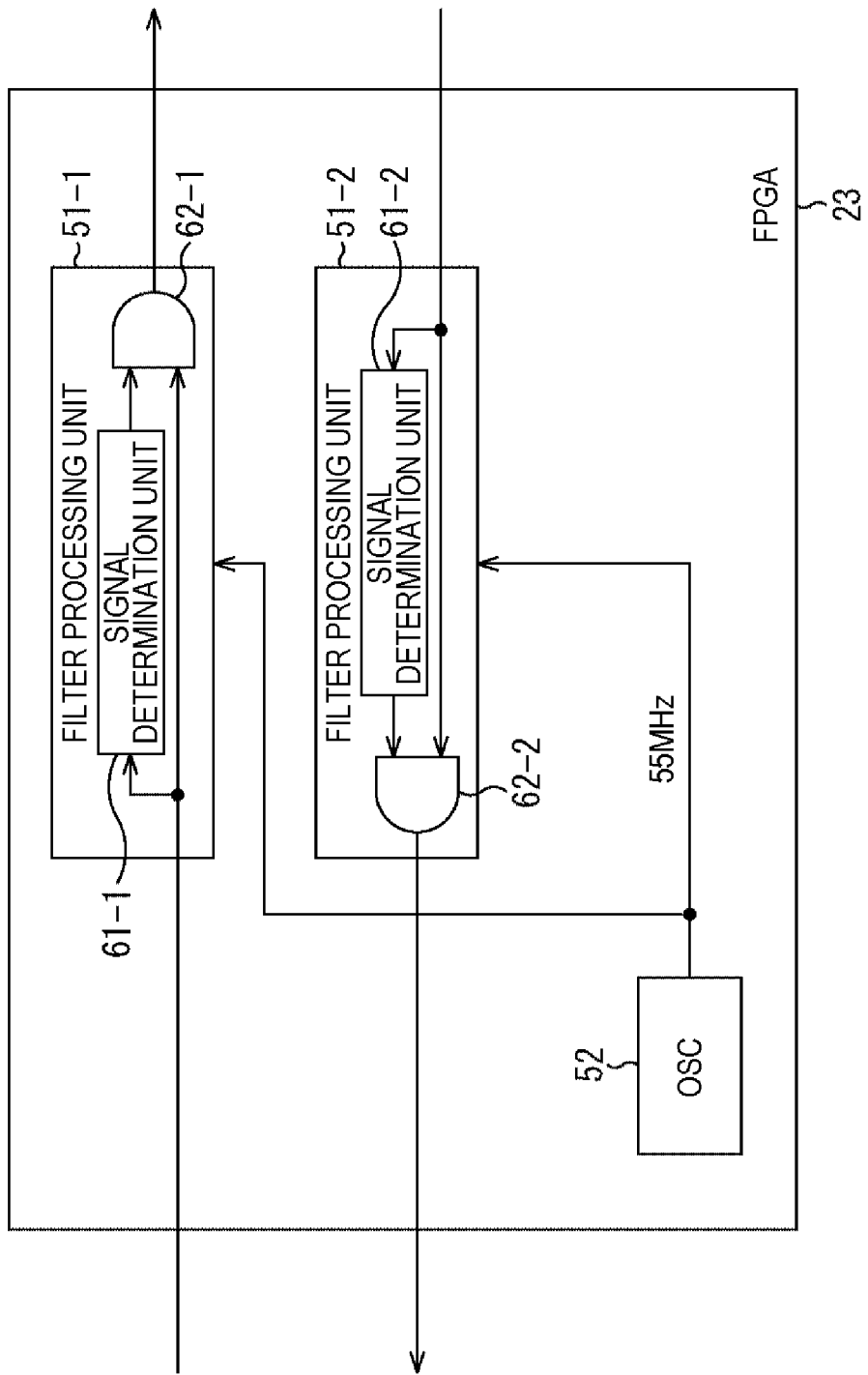
FIG. 4 is a block diagram illustrating a configuration example of an FPGA.

FIG. 4 is a block diagram illustrating a configuration example of the FPGA 23.

The FPGA 23 in FIG. 4 includes filter processing units 51-1 and 51-2, and an oscillator (OSC) 52.

The filter processing unit 51-1 receives, via the reception circuit 21, a signal transmitted from the R/W 1, and performs, on the basis of a frequency of an OSC clock supplied from the OSC 52, filter processing on the received signal. The filter processing unit 51-1 transmits the filtered signal to the card 2 via the transmission circuit 31.

The filter processing unit 51-1 includes a signal determination unit 61-1 and an AND circuit 62-1. The signal determination unit 61-1 and the AND circuit 62-1 perform noise filter processing on input signals so that a signal unrelated to a signal transmitted through contactless communication with the R/W 1 is not transmitted to the transmission circuit 31 during non-communication time or during processing of the card 2.

Specifically, normally, the signal determination unit 61-1 detects a signal (command) transmitted from the R/W 1 through contactless communication. Unlike noise, the signal transmitted from the R/W 1 through the contactless communication is a signal that repeats 1 (H) and 0 (L). Upon detecting a signal, the signal determination unit 61-1 determines, by using a first six bits to eight bits of a 48-bit preamble for determination of a baud rate, whether or not the baud rate of the signal indicates a correct value (for example, 212 kbps).

The signal determination unit 61-1 outputs 0 (L) until the signal is determined. If having determined that the baud rate is a correct value, the signal determination unit 61-1 outputs 1 (H) until the signal ends. If having determined that the baud rate is not a correct value, the signal determination unit 61-1 outputs 0 (L).

The AND circuit 62-1 inputs a signal directly input without the signal determination unit 61-1 and a signal supplied from the signal determination unit 61-1, and outputs a calculation result. In a case where, as a result, the baud rate is determined to be a correct value, the AND circuit 62-1 outputs a signal of a ninth bit and subsequent bits of the preamble.

The filter processing unit 51-2 receives, via the reception circuit 32, a signal transmitted from the card 2, and performs filter processing on the received signal on the basis of a frequency of an OSC clock supplied from the OSC 52. The filter processing unit 51-2 transmits the filtered signal to the R/W 1 via the transmission circuit 22.

The filter processing unit 51-2 includes a signal determination unit 61-2 and an AND circuit 62-2. The signal determination unit 61-2 and the AND circuit 62-2 perform noise filter processing on input signals so that a signal unrelated to a signal transmitted through contactless communication with the card 2 is not transmitted to the transmission circuit 22 during non-communication time or during processing of the R/W 1.

Specifically, normally, the signal determination unit 61-2 detects a signal (response) transmitted from the card 2 through contactless communication. Unlike noise, the signal transmitted from the card 2 through the contactless communication is a signal that repeats 1 (H) and 0 (L). Upon detecting a signal, the signal determination unit 61-2 determines, by using a first six bits to eight bits of a 48-bit preamble for determination of a baud rate, whether or not the baud rate of the signal indicates a correct value (for example, 212 kbps).

The signal determination unit 61-2 outputs 0 (L) until the signal is determined. If having determined that the baud rate is a correct value, the signal determination unit 61-2 outputs 1 (H) until the signal ends. If having determined that the baud rate is not a correct value, the signal determination unit 61-2 outputs 0 (L).

The AND circuit 62-2 inputs a signal directly input without the signal determination unit 61-2 and a signal supplied from the signal determination unit 61-2, and outputs a calculation result. In a case where, as a result, the baud rate is determined to be a correct value, the AND circuit 62-2 outputs a signal of a ninth bit and subsequent bits of the preamble.

Note that, hereinafter, in a case where it is not necessary to distinguish the filter processing unit 51-1 and the filter processing unit 51-2 from each other, the filter processing units 51-1 and 51-2 will be referred to as a filter processing unit 51. In a case where it is not necessary to distinguish the signal determination unit 61-1 and the signal determination unit 61-2 from each other, the signal determination units 61-1 and 61-2 will be referred to as a signal determination unit 61. In a case where it is not necessary to distinguish the AND circuit 62-1 and the AND circuit 62-2 from each other, the AND circuits 62-1 and 62-2 will be referred to as an AND circuit 62.

The OSC 52 generates, for example, a 55-MHz OSC clock, and supplies a frequency of the generated OSC clock to the filter processing units 52-1 and 52-2.

(Anti-Reverse Filter Processing)

Figure 5:
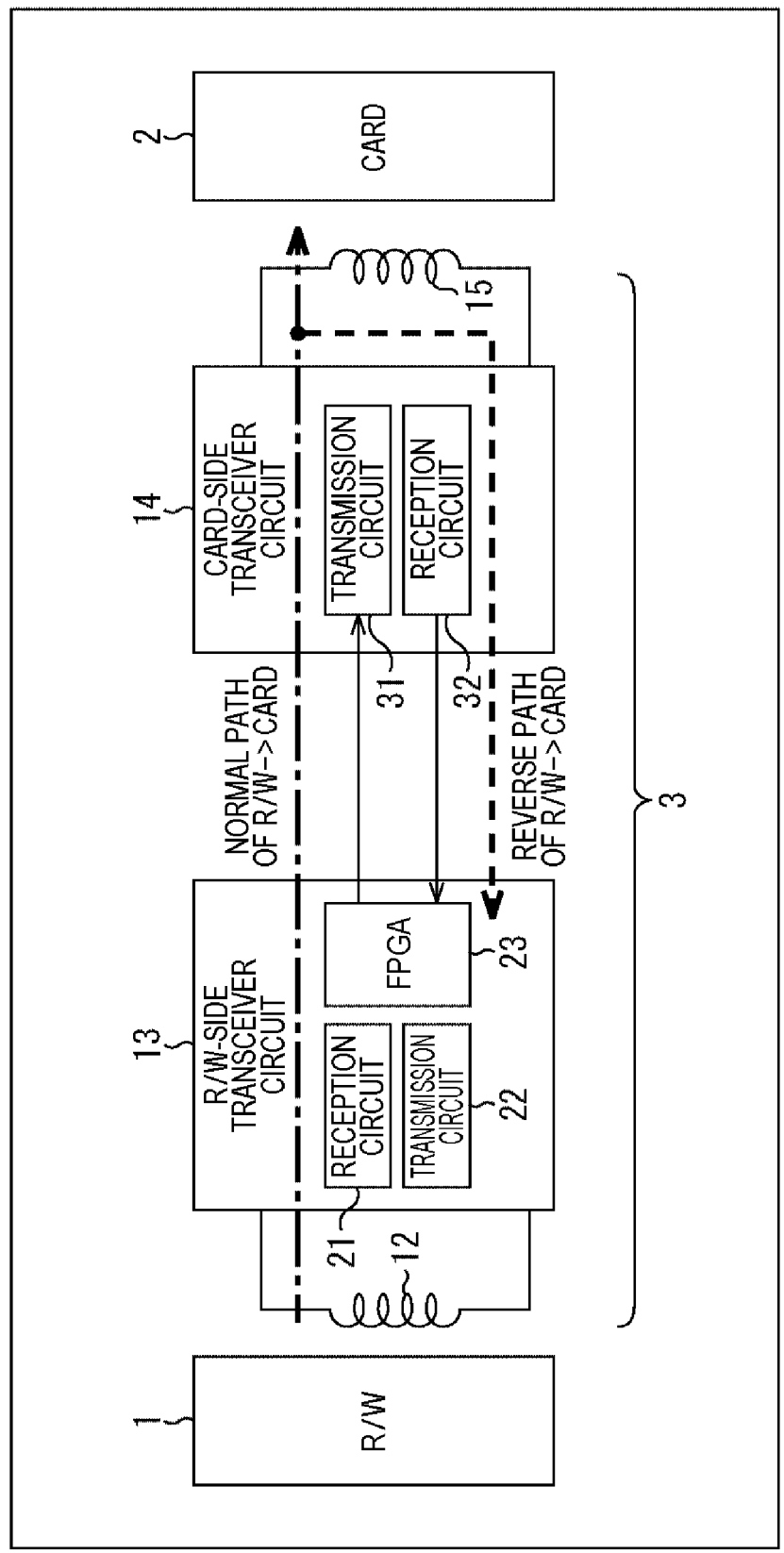
FIG. 5 is an image diagram illustrating an example of anti-reverse filter processing.

FIG. 5 is an image diagram illustrating an example of anti-reverse filter processing Note that, in FIG. 5, illustration of the external power supply 16 is omitted.

FIG. 5 illustrates signal paths in the communication system in FIG. 1. In FIG. 5, the alternate long and short dash line represents a normal path when a signal is transmitted from the R/W 1 to the card 2. The broken line represents a reverse path of noise when a signal is transmitted from the R/W 1 to the card 2.

That is, when a signal is transmitted from the R/W 1 to the card 2 via an FRGA 23, the reception circuit 32 of the card-side transceiver circuit 14 also operates simultaneously. The operation of the reception circuit 32 may cause malfunction in the R/W-side transceiver circuit 13, and a signal reversing to a side close to the R/W-side transceiver circuit 13 may be directly transmitted to the side close to the R/W 1.

Therefore, in the communication system, when a signal is transmitted from the R/W 1 to the card 2, the FRGA 23 performs anti-reverse filter processing so that a signal to the R/W 1 does not reverse.

Similarly, although not illustrated, when a signal is transmitted from the card 2 to the R/W 1, the FRGA 23 performs anti-reverse filter processing so that the signal does not reverse to the side close to the card 2.

Specifically, in a case where a signal is transmitted from the R/W 1 to the card 2, a signal in the reverse path indicated by the broken line in FIG. 5 is generated simultaneously with generation of the signal in the normal path indicated by the alternate long and short dash line in FIG. 5. Therefore, the FRGA 23 performs filter processing of blocking the signal in the reverse path, by which reverse of the signal is prevented, and chances of malfunction of the R/W-side transceiver circuit 13 are reduced.

The anti-reverse filter processing utilizes a fact that, while a signal delay in the normal path is only a wire delay or a gate delay, a signal delay in the reverse path is longer by an amount of the signal taking a roundabout path in the card-side transceiver circuit 14, resulting in the signal delay in the reverse path being longer than the signal delay in the normal path. That is, the anti-reverse filter processing is achieved in the FRGA 23 by opening a gate of the normal path (alternate long and short dash line) first, and then closing a gate of the reverse path (broken line).

Specifically, the AND circuits 62-1 and 62-2 are configured to be able to detect opening and closing operations of each other. In a case where a signal is input, the AND circuit 62-1 opens the gate of the normal path and passes the input signal. The AND circuit 62-2 detects the AND circuit 62-1 opening the gate, and even if a signal is input thereafter, closes the gate of the reverse path so that the signal arriving later does not flow.

Similarly, in a case where a signal is transmitted from the card 2 to the R/W 1, a normal path runs from the card 2 through the reception circuit 32, the FPGA 23 (AND circuit 62-2), and the transmission circuit 22 to the R/W 1, and a reverse path runs from the reception circuit 21 through the FPGA 23 to the transmission circuit 31. In this case, in a case where a signal is input, the AND circuit 62-2 opens the gate of the normal path and passes the input signal. The AND circuit 62-1 detects the AND circuit 62-2 opening the gate and, even if a signal is input thereafter, closes the gate of the reverse path so that the signal arriving later does not flow.

The anti-reverse filter processing can be performed by implementing, in the FPGA 23, the OSC 52 that generates a clock (for example, 55 MHz) having a frequency higher than a carrier frequency.

Note that, because the normal path is always either one of the paths, when opening the gate of either one of the paths in a case where the OSC 52 is not used, that is, in a case where the carrier frequency is used, anti-reverse filter processing is possible by closing the gate of the other path exclusively.

Specifically, in a case where a signal is transmitted from the R/W 1 to the card 2, the path passing through the AND circuit 62-1 is the normal path, and therefore, the AND circuit 62-1 opens the gate of the normal path. The AND circuit 62-2 closes the gate exclusively in response to the AND circuit 62-1 opening the gate.

Meanwhile, in a case where a signal is transmitted from the card 2 to the R/W 1, the path passing through the AND circuit 62-2 is the normal path, and therefore, the AND circuit 62-2 opens the gate of the normal path. The AND circuit 62-1 closes the gate exclusively in response to the AND circuit 62-2 opening the gate.

Because anti-reverse filter processing is performed as described above, reverse of the signal is prevented, and chances of malfunction of the transmission circuit 31 or the transmission circuit 22 are reduced.

(Noise Filtering)

Figure 6:
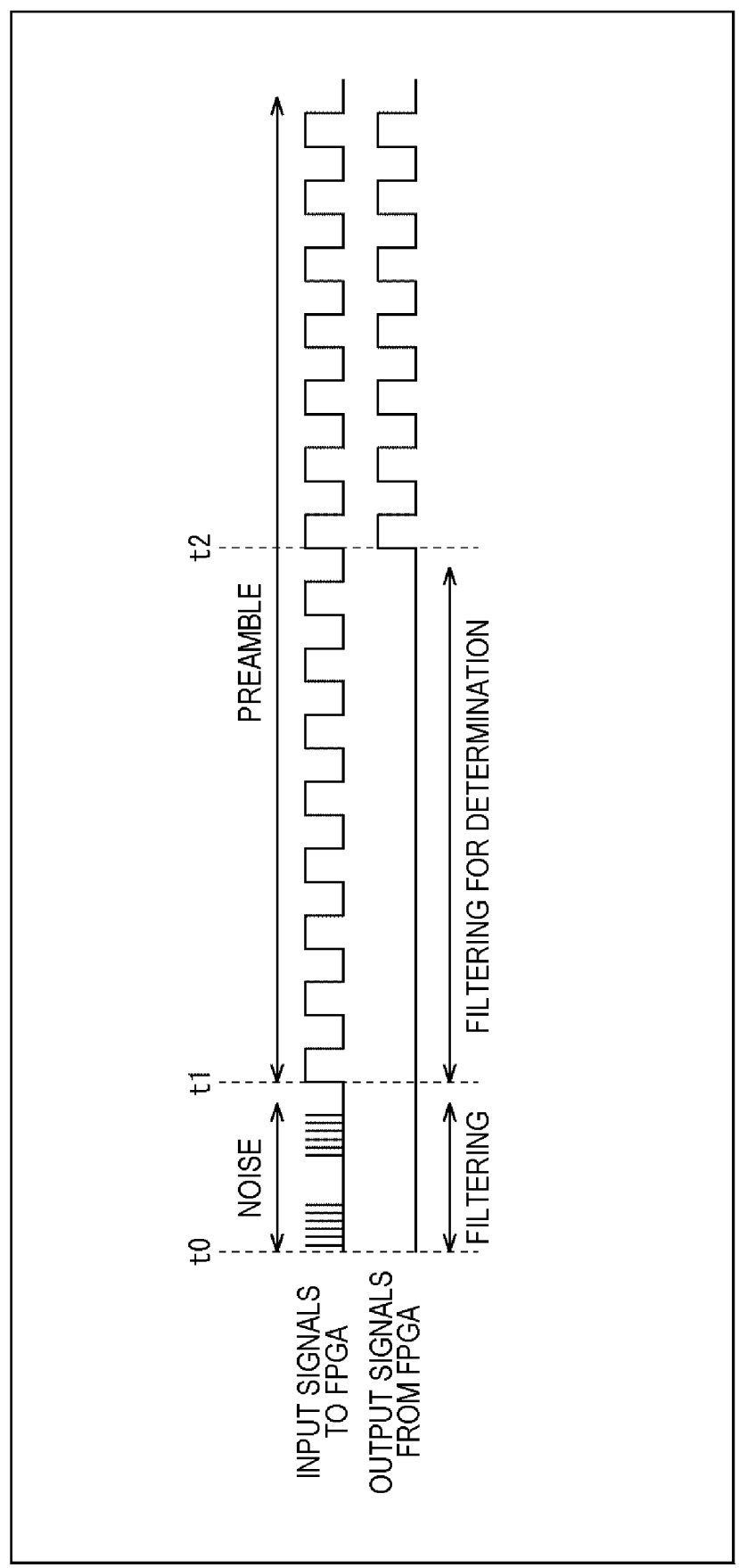
FIG. 6 is a diagram illustrating an example of noise filter processing.

FIG. 6 is a diagram illustrating an example of noise filter processing.

In FIG. 6, a state of input signals input to the FPGA 23 is illustrated in the upper part, and a state of output signals output from the FPGA 23 is illustrated in the lower part.

(A preamble of) a signal transmitted through contactless communication is a signal in which 1 (H) and 0 (L) are alternately repeated. The 1 (H) or the 0 (L) represents one bit of the signal.

During a period between a timing t0 and a timing t1, input signals including noise are input to the FPGA 23. The input signals are not signals transmitted through contactless communication, and therefore 0 (L) is output from the signal determination unit 61, and 0 (L) is output from the FPGA 23.

During a period between a timing t1 and a timing t2, input signals of one bit to eight bits among preambles of signals transmitted through contactless communication is input to the FPGA 23. By using the input signals of one bit to eight bits, the signal determination unit 61 performs filter processing for determining a baud rate. Until it is determined whether or not the baud rate is correct, 0 (L) is output from the signal determination unit 61, and 0 (L) is output from the FPGA 23.

At and after the timing t2, input signals of a ninth bit and subsequent bits among the preambles of the signals transmitted through contactless communication are input to the FPGA 23. During the above-described period between the timing t1 to the timing t2, in a case where it is determined, by the baud rate determination of the one bit to eight bits, that the baud rate is correct, 1 (H) is output from the signal determination unit 61, and a signal in which 1 (H) and 0 (L) are alternately repeated is output from the FPGA 23.

As described above, in the FPGA 23, an input signal is output as is without being buffered. That is, a signal delay time is only a gate delay and a wire delay, and is of a few dozen NS.

Therefore, according to the present technology, it is possible to extend a communication distance while reducing an increase in time from completion of command transmission from the R/W 1, to reception by the card 2. Furthermore, according to the present technology, it is possible to extend a communication distance while reducing an increase in time until the R/W 1 completes reception of a response from the card 2.

That is, according to the present technology, unlike in the prior art, it is not necessary to buffer a signal in the signal processing apparatus, and therefore, it is possible to transmit a signal between the R/W 1 and the card 2, only with a wire delay and a gate delay.

Specifically, in the present technology, by performing gating processing while monitoring (detecting, determining) signals from the R/W 1 or the card 2, it is possible to output the signals as they are without buffering the signal. That is, because signals sent from the R/W 1 to the card 2 are branched into a line passing through the signal determining unit 61-1 and a line not passing through the signal determination unit 61-1 and monitored, and signals sent to the card 2 only pass through the filter processing unit 51-1, which is a circuit for gating, buffering is not necessary. Similarly, because signals sent from the card 2 to the R/W 1 are branched into a line passing through the signal determining unit 61-2 and a line not passing through the signal determination unit 61-2 and monitored, and signals sent to the R/W 1 only pass through the filter processing unit 51-2, which is a circuit for gating, buffering is not necessary.

As described above, it is possible to extend a communication distance while reducing a signal delay in contactless communication between the R/W 1 and the card 2.

<2. First Use Case>

(Exterior of Communication System of Present Technology)

Figure 7:
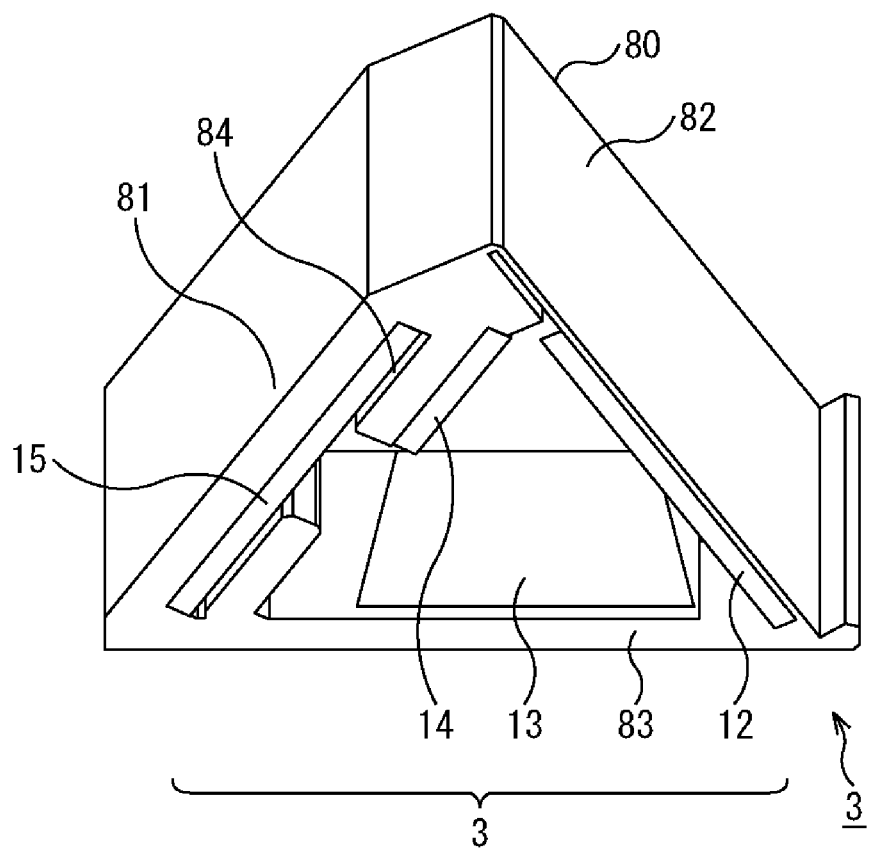
FIG. 7 is a diagram illustrating an exterior of a communication system of the present technology.

FIG. 7 is a diagram illustrating an exterior of a communication system of the present technology.

The communication system in FIG. 7 assumes a use case in which a store clerk of a convenience store uses, as a payment terminal, a business smartphone incorporating the R/W 1, and the store clerk and a customer face each other.

In FIG. 7, a housing 80 of the communication system includes a card hold surface 81 over which the card 2 is held by the customer, an R/W installation surface 82 on which a smartphone incorporating the R/W 1 is installed by the store clerk, and a bottom surface 83 disposed on a tabletop. Note that, in FIG. 7, illustration of wiring or the like connecting each circuit and each antenna is omitted.

The card hold surface 81 is disposed inclined, forming an angle of approximately 45 degrees with respect to the bottom surface 83 to be easily viewed by the customer. With a side thereof, which intersects the card hold surface 81, facing upward, the R/W installation surface 82 is disposed inclined forming an angle of approximately 60 degrees with respect to the bottom surface 83, so that the smartphone can be disposed on the R/W installation surface 82. A top edge of the card hold surface 81 and a top edge of the R/W installation surface 82 are connected.

That is, the card hold surface 81, the R/W installation surface 82, and the bottom surface 83 are assembled so as to form a substantially triangular shape when viewed from a surface perpendicularly intersecting the card hold surface 81, the R/W installation surface 82, and the bottom surface 83.

An antenna housing part 84 is formed on a back side of the card hold surface 81. The card-side antenna 15 is attached to the back side of the card hold surface 81 and housed in the antenna housing part 84.

The card-side transceiver circuit 14 is attached to a surface of the antenna housing part 84, the surface being on a side on which the card-side antenna 15 is not housed.

Figure 8:
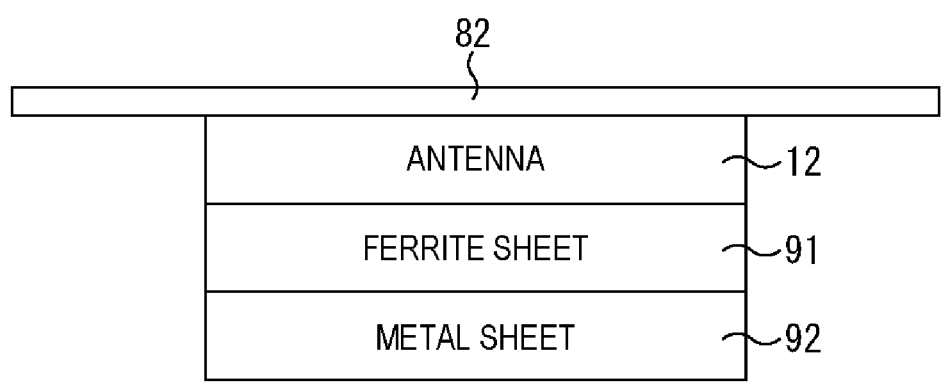
FIG. 8 is a diagram illustrating an example of members attached to an R/W-side antenna.

The R/W-side antenna 12 is attached to a back side of the R/W installation surface 82. As illustrated in FIG. 8, a ferrite sheet 91 and a metal sheet 92 are attached in this order to a back side of the R/W-side antenna 12. For the R/W-side antenna 12, by attaching these members to a side opposite to the R/W installation surface 82, an effect of an RF magnetic field from the R/W 1 on communication can be reduced.

The R/W-side transceiver circuit 13 is installed on an upper side of the bottom surface 83 in the drawing.

Note that the housing 80 is designed to have a margin in a vertical length of the R/W installation surface 82 in order to install, with respect to the antenna of the R/W 1 incorporated in the smartphone, the R/W-side antenna 12 at a part where best communication performance is achieved.

The store clerk disposes, on the R/W installation surface 82, the business smartphone incorporating the R/W 1 to bring the business smartphone close to the R/W-side antenna 12.

The customer holds the card 2 over the card hold surface 81 to bring the card 2 close to the card-side antenna 15 attached to the back side of the card hold surface 81.

With the above configuration, as described above with reference to FIG. 1, the R/W 1 and the card 2 can transmit and receive signals through contactless communication via the signal processing apparatus 3.

A communication distance extended by the card-side transceiver circuit 14 of the signal processing apparatus 3 can be arbitrarily changed according to a use case or a purpose. For example, as described above, in a case where the business smartphone is used only as a payment terminal, a size of the card-side antenna 15 is sufficient even if an antenna having an external size smaller than an external size of the card-side antenna 15 illustrated in FIG. 7 is used.

In that case, a radiated magnetic field is small, and therefore, an effect on communication between the R/W-side transceiver circuit 13 and a business smartphone is reduced. With this arrangement, communication is more stable.

The extended communication distance varies depending on a size, performance, or the like of the antenna, but is constant regardless of an amount of data to be transmitted and received and of a communication distance between the business smartphone and the R/W-side antenna 12.

<3. Second Use Case>
(Exterior of Apparatus Incorporating R/W)

Figure 9:
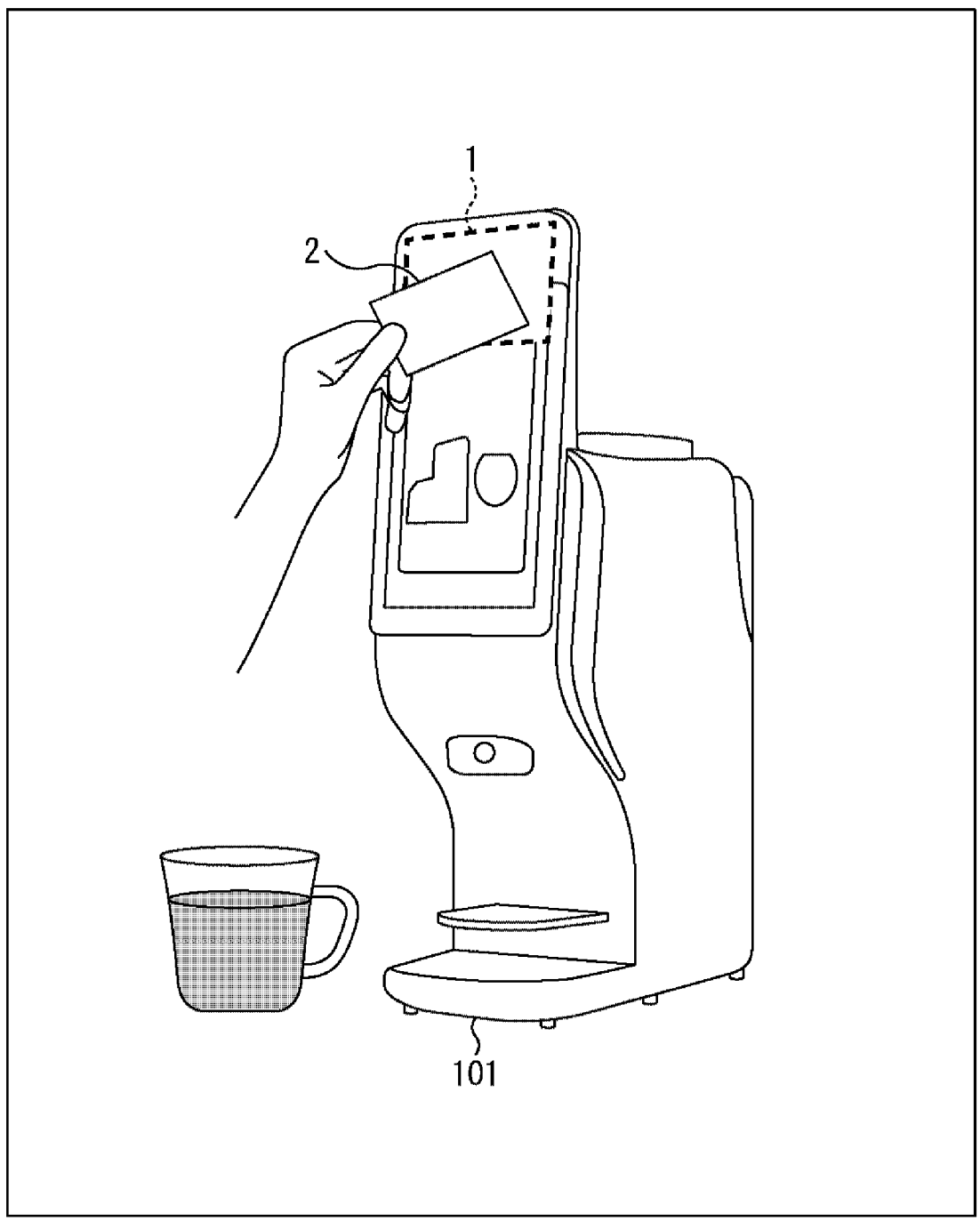
FIG. 9 is a diagram illustrating an exterior of an apparatus incorporating an R/W.

FIG. 9 is a diagram illustrating an exterior of an apparatus incorporating an R/W.

FIG. 9 illustrates an exterior of a coffee maker in which the R/W 1 is incorporated in a housing 101.

The R/W 1 is incorporated in the housing 101 of the coffee maker. For example, inside the housing 101, the antenna of the R/W 1 is included at a front surface of the housing 101, which is a part indicated by the dotted line in the drawing. By the customer holding the card 2 over the antenna of the R/W 1, the R/W 1 and the card 2 can transmit and receive signals. With this arrangement, the customer can pay for coffee by using the card 2.

However, in a case where the R/W 1 is incorporated in the housing 101, there is a case where it is not possible to select an R/W having a sufficiently large antenna size/communication performance (including a communication distance) due to restriction of an installation size or area. In this case, the signal processing apparatus 3 including a housing 111 as illustrated in FIG. 10 is installed.

(Exterior of Signal Processing Apparatus of Present Technology)

Figure 10:
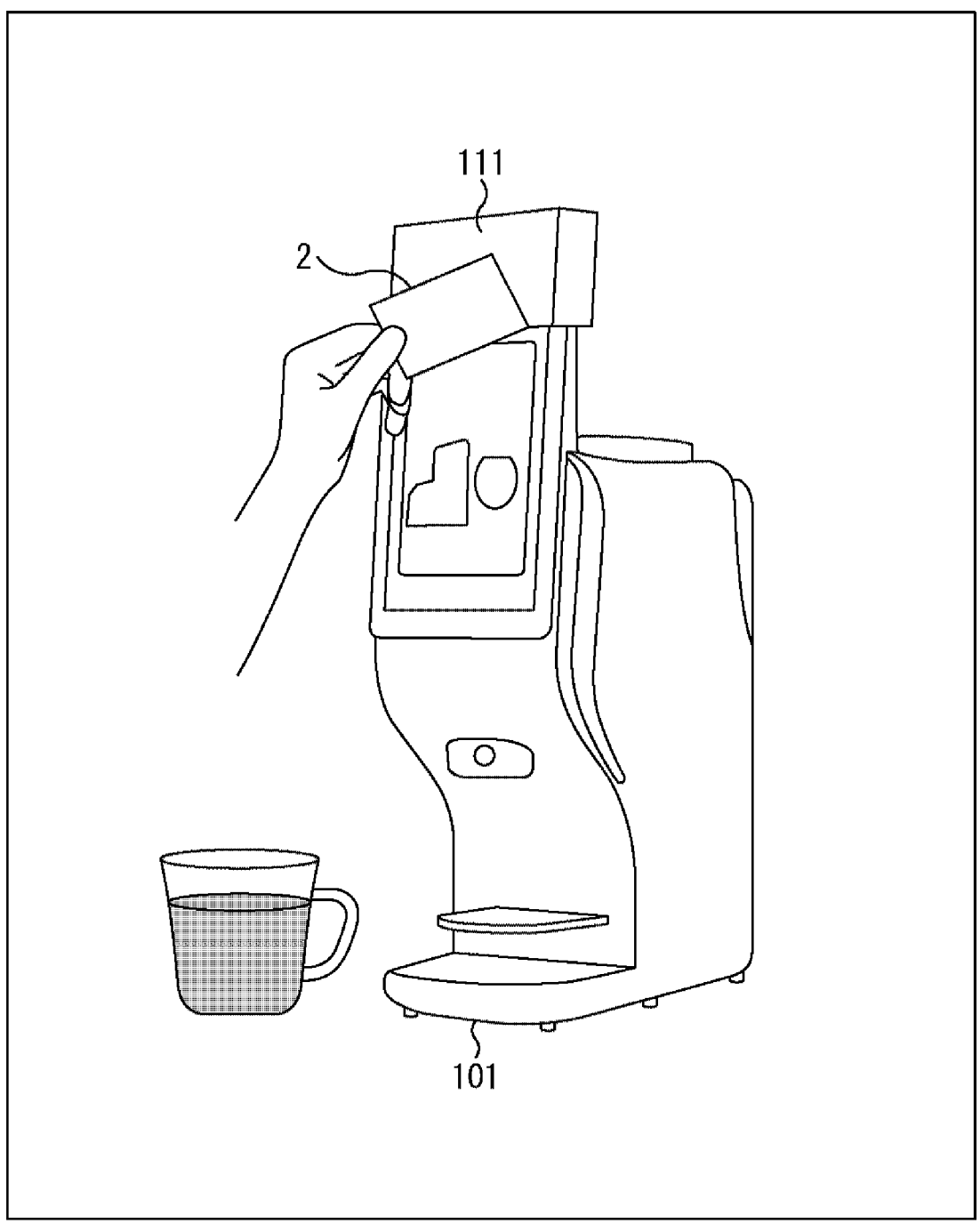
FIG. 10 is a diagram illustrating an exterior of a signal processing apparatus of the present technology.

FIG. 10 is a diagram illustrating an exterior of a signal processing apparatus of the present technology.

In FIG. 10, at the front surface of a portion where the antenna of the R/W 1 of the housing 101 of the coffee maker is included, the housing 111 of the signal processing apparatus 3 is mounted on the housing 101 of the coffee maker so as to face the R/W-side antenna 12 of the signal processing apparatus 3.

Figure 11:
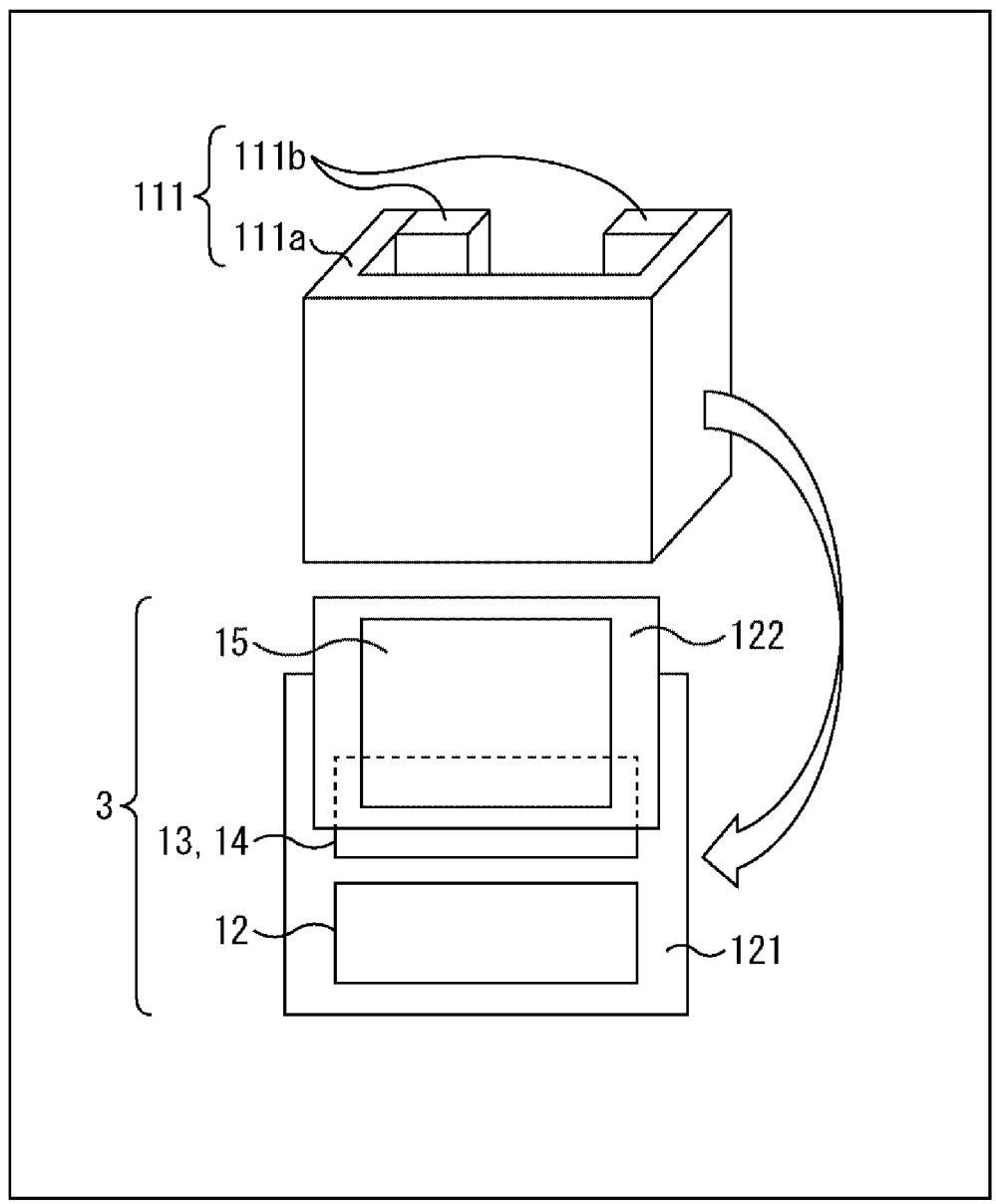
FIG. 11 is a diagram illustrating a configuration example of the signal processing apparatus.

As illustrated in FIG. 11, the housing 111 of the signal processing apparatus 3 is formed in a shape in which support parts 111b are mounted on both ends of a U-shape 111a so as to be able to be mounted the housing 111, for example. At a time of the mounting, in the housing 111, a substrate 121 equipped with the R/W-side antenna 12, the R/W-side transceiver circuit 13, and the card-side transceiver circuit 14 is installed on a back side of a front part of the U-shape 111a, that is, a side closer to the antenna of the R/W 1 of the housing 101. Then, in the substrate 121, a substrate 122 equipped with the card-side antenna 15 is provided on a front surface on a side opposite to a side close to the housing 101.

The customer holds the card 2 over a front surface of the card-side antenna 15 of the signal processing apparatus 3 mounted in this manner on the housing 101 of the coffee maker. With this arrangement, the R/W 1 and the card 2 can transmit and receive signals via the signal processing apparatus 3, and therefore, the customer can pay for coffee by using the card 2.

As described above, by installing the housing 111 of the signal processing apparatus 3 of the present technology so as to cover the housing 101 of the coffee maker, it is possible to secure an antenna of a sufficient size/communication performance (including a communication distance) without making any modification on a coffee maker side, and to extend the communication distance.

<4. Others>
(Effects of Present Technology)

In the present technology, first filter processing is performed on a signal received from a reader/writer via a first antenna, and the signal is transmitted to a contactless communication apparatus via a second antenna. Then, second filter processing is performed on a signal received from the contactless communication apparatus via the second antenna, and the signal is transmitted to the reader/writer via the first antenna.

With this arrangement, it is possible to extend a communication distance while reducing a signal delay in contactless communication.

Note that, although FIG. 1 illustrates an example in which the R/W-side transceiver circuit 13 and the card-side transceiver circuit 14 are mounted on different substrates, the R/W-side transceiver circuit 13 and the card-side transceiver circuit 14 may be mounted on one substrate, as illustrated in FIG. 11. Furthermore, the R/W-side antenna 12 may be mounted on the same substrate as the R/W-side transceiver circuit 13, or may be mounted on a different substrate. Similarly, the card-side antenna 15 may be mounted on the same substrate as the card-side transceiver circuit 14, or may be mounted on a different substrate.

Furthermore, although FIG. 1 describes an example in which the FPGA 23 is provided in the R/W-side transceiver circuit 13, the present invention is not limited to the configuration in FIG. 1, and the FPGA 23 may be provided in the card-side transceiver circuit 14.

(Configuration Example of Computer)

The above-described series of processing can be executed by hardware or can be executed by software. In a case where the series of processing is executed by software, a program included in the software is installed from a program recording medium to a computer incorporated in dedicated hardware, a general-purpose personal computer, or the like.

FIG. 12 is a block diagram illustrating a configuration example of hardware of a computer that executes the above-described series of processing with a program.

A CPU 301, a read only memory (ROM) 302, and a RAM 303 are connected to one another by a bus 304.

Moreover, an input/output interface 305 is connected to the bus 304. The input/output interface 305 is connected to an input unit 306 including a keyboard, a mouse, or the like, and to an output unit 307 including a display, a speaker, or the like. Furthermore, the input/output interface 305 is connected to a storage unit 308 including a hard disk, a non-volatile memory, or the like, to a communication unit 309 including a network interface or the like, and to a drive 310 that drives a removable medium 311.

In a computer configured as above, the series of processing described above is performed by the CPU 301 loading, for example, a program stored in the storage unit 308 to the RAM 303 via the input/output interface 305 and the bus 304 and executing the program.

The program executed by the CPU 301 is provided, for example, by being recorded on the removable medium 311 or via a wired or wireless transmission medium such as a local area network, the Internet, or digital broadcasting, and is installed on the storage unit 308.

Note that, the program executed by the computer may be a program that is processed in time series in an order described in this specification, or a program that is processed in parallel or at a necessary timing such as when a call is made.

Note that, in the present specification, the system means a set of a plurality of components (apparatuses, modules (parts), or the like) without regard to whether or not all the components are in the same housing. Therefore, a plurality of apparatuses housed in separate housings and connected via a network, and one apparatus housing a plurality of modules in one housing are both systems.

Furthermore, the effects described herein are only examples, and the effects of the present technology are not limited to these effects. Additional effects may also be obtained.

Embodiments of the present technology are not limited to the above-described embodiments, and various changes can be made without departing from the scope of the present technology.

For example, the present technology can have a configuration of cloud computing in which one function is shared and processed jointly by a plurality of apparatuses via a network.

Furthermore, each step described in the above-described flowcharts can be executed by one apparatus, or can be executed by being shared by a plurality of apparatuses.

Moreover, in a case where a plurality of pieces of processing is included in one step, the plurality of pieces of processing included in the one step can be executed by being shared by a plurality of apparatuses, in addition to being executed by one apparatus.

<Examples of Configuration Combination>

The present technology can have the following configurations.

(1)
A signal processing apparatus including
 a signal processing unit that performs first filter processing on a signal received from a reader/writer via a first antenna, transmits the signal to a contactless communication apparatus via a second antenna, performs second filter processing on a signal received from the contactless communication apparatus via the second antenna, and transmits the signal to the reader/writer via the first antenna.

(2)
The signal processing apparatus according to (1),
 in which the signal processing unit includes a clock generation unit that generates a clock of a frequency higher than a frequency of a carrier wave of contactless communication, and performs, on the basis of the frequency of the clock generated by the clock generation unit, the first filter processing or the second filter processing on the received signal.

(3)
The signal processing apparatus according to (2),
 in which the signal processing unit includes a first filter processing unit that performs the first filter processing, and
 a second filter processing unit that performs the second filter processing, and
 of the first filter processing unit and the second filter processing unit,
 starts output from a filter processing unit to which a signal is input first, and stops output from another filter processing unit.

(4)
The signal processing apparatus according to (1),
 in which, on the basis of a frequency of a carrier wave of contactless communication, the signal processing unit performs filter processing on a received signal.

(5)
The signal processing apparatus according to (4),
 in which the signal processing unit includes a first filter processing unit that performs the first filter processing, and
 a second filter processing unit that performs the second filter processing, in a case where a signal received from the reader/writer is input, starts output from the first filter processing unit while stopping output from the second filter processing unit exclusively, and in a case where a signal received from the contactless communication apparatus is input, starts output from the second filter processing unit while stopping output from the first filter processing unit exclusively.

(6)

The signal processing apparatus according to any one of (1) to (5), in which the signal processing unit performs noise filter processing as filter processing.

(7)

The signal processing apparatus according to (6), in which the signal processing unit performs the noise filter processing by using a beginning part of a preamble of a received signal.

(8)

The signal processing apparatus according to (7), in which the signal processing unit performs the noise filter processing by determining whether or not a baud rate of the received signal indicates a correct value.

(9)

The signal processing apparatus according to any one of (1) to (8), in which a housing of the signal processing apparatus includes an installation surface on which the reader/writer is installed, a hold surface over which the contactless communication apparatus is held, and a bottom surface, the installation surface is provided on a first-side side of the bottom surface, such that a first inclination angle with respect to the bottom surface is formed to be an acute angle, and the hold surface is provided on a second-side side facing the first side of the bottom surface, such that a second inclination angle with respect to the bottom surface is formed to be an acute angle, and the first antenna is provided on a back of the installation surface, and the second antenna is provided on a back of the hold surface.

(10)

The signal processing apparatus according to (9), in which a ferrite sheet and a metal sheet are attached to a side of the first antenna, the side being opposite to the installation surface.

(11)

The signal processing apparatus according to any one of (1) to (8), in which a first substrate equipped with the first antenna is provided on a part of an apparatus incorporating the reader/writer, the part facing an antenna of the reader/writer, and a second substrate equipped with the second antenna is provided on a surface of the first substrate, the surface being opposite to a surface facing an antenna of the reader/writer.

(12)

The signal processing apparatus according to (11), in which the first substrate and the second substrate are provided in a housing that is able to be mounted on the apparatus.

(13)

A signal processing method including performing first filter processing on a signal received from a reader/writer via a first antenna, transmitting the signal to a contactless communication apparatus via a second antenna, performing second filter processing on a signal received from the contactless communication apparatus via the second antenna, and transmitting the signal to the reader/writer via the first antenna.

(14)

A program causing a computer to function as a signal processing unit that performs first filter processing on a signal received from a reader/writer via a first antenna, transmits the signal to a contactless communication apparatus via a second antenna, performs second filter processing on a signal received from the contactless communication apparatus via the second antenna, and transmits the signal to the reader/writer via the first antenna.

REFERENCE SIGNS LIST

1 R/W
2 Card
3 Signal processing apparatus
12 R/W-side antenna
13 R/W-side transceiver circuit
14 Card-side transceiver circuit
15 Card-side antenna
16 External power supply
21 Reception circuit
22 Transmission circuit
23 FPGA
31 Transmission circuit
32 Reception circuit
51, 51-1, 51-2 Filter processing unit
52 OSC
61, 61-1, 61-2 Signal processing unit
62, 62-1, 62-2 AND circuit
80 Housing
81 Card hold surface
82 R/W installation surface
83 Bottom surface
84 Antenna housing part
91 Ferrite sheet
92 Metal sheet
101 Housing
111 Housing
121, 122 Substrate

The invention claimed is:

1. A signal processing apparatus, comprising:

a first antenna configured to receive a first signal from a reader/writer;

a signal processing unit that includes a clock generation unit configured to generate a clock frequency higher than a frequency of a carrier wave of contactless communication, wherein the signal processing unit is configured to perform, based on the generated clock frequency, a first filter process on the received first signal; and a second antenna configured to:
transmit the received first signal to a contactless communication apparatus based on the first filter process; and
receive a second signal from the contactless communication apparatus, wherein
the signal processing unit is further configured to perform, based on the generated clock frequency, a second filter process on the received second signal, and
the first antenna is further configured to transmit the received second signal to the reader/writer based on the second filter process.

2. The signal processing apparatus according to claim 1 wherein
the signal processing unit further includes;
a first filter processing unit configured to perform the first filter process; and
a second filter processing unit configured to perform the second filter process, and
the signal processing unit is further configured to:
start, based on one of the received first signal or the received second signal, an output from one of the first filter processing unit or the second filter processing unit; and
stop an output from the other of the first filter processing unit or the second filter processing unit.

3. The signal processing apparatus according to claim 1, wherein the signal processing unit is further configured to perform, based on the frequency of the carrier wave of contactless communication, a third filter process on one of the received first signal or the received second signal.

4. The signal processing apparatus according to claim 3, wherein
the signal processing unit further includes;
a first filter processing unit configured to perform the first filter process; and
a second filter processing unit configured to perform the second filter process, and
the signal processing unit is further configured to:
determine that one of the first signal or the second signal is input;
start an output from the first filter processing unit based on the determination that the first signal is input;
stop an output from the second filter processing unit based on the determination that the first signal is input;
start the output from the second filter processing unit based on the determination that the second signal is input; and
stop the output from the first filter processing unit based on the determination that the second signal is input.

5. The signal processing apparatus according to claim 1, wherein each of the first filter process and the second filter process corresponds to a noise filter process.

6. The signal processing apparatus according to claim 5, wherein the signal processing unit is further configured to perform the noise filter process based on a beginning part of a preamble of one of the received first signal or the received second signal.

7. The signal processing apparatus according to claim 6, wherein the signal processing unit is further configured to:
determine a baud rate of one of the received first signal or the received second signal; and
perform the noise filter process based on the determined baud rate indicates a correct value.

8. The signal processing apparatus according to claim 1, further comprises a housing that includes:
an installation surface for installation of the reader/writer;
a hold surface over to hold the contactless communication apparatus; and
a bottom surface, wherein
the installation surface is on a first side of the bottom surface,
a first inclination angle between the installation surface and the bottom surface is an acute angle,
the hold surface is on a second side of the bottom surface,
the first side faces the second side,
a second inclination angle between the hold surface and the bottom surface is an acute angle,
the first antenna is on a back of the installation surface, and
the second antenna is on a back of the hold surface.

9. The signal processing apparatus according to claim 8, wherein
a ferrite sheet and a metal sheet are attached to a side of the first antenna, and
the side of the first antenna is opposite to the installation surface.

10. The signal processing apparatus according to claim 1, further comprises:
a first substrate on a part of an apparatus that incorporates the reader/writer, wherein
the first substrate includes the first antenna, and
the part of the apparatus faces a third antenna of the reader/writer; and
a second substrate on a first surface of the first substrate, wherein
the second substrate includes the second antenna,
the first surface is opposite to a second surface of the first substrate, and
the second surface faces the third antenna of the reader/writer.

11. The signal processing apparatus according to claim 10, further comprises a housing that includes the first substrate and the second substrate, wherein the housing is mountable on the apparatus.

12. A signal processing method, comprising:
receiving, via a first antenna, a first signal from a reader/writer;
generating a clock frequency higher than a frequency of a carrier wave of contactless communication;
performing, based on the generated clock frequency, a first filter processing on the received first signal;
transmitting, via a second antenna, the received first signal to a contactless communication apparatus based on the first filter processing;
receiving, via the second antenna, a second signal from the contactless communication apparatus;
performing, based on the generated clock frequency, a second filter processing on the received second signal; and
transmitting, via the first antenna, the received second signal to the reader/writer based on the second filter process.

13. A non-transitory computer-readable medium having stored thereon, computer-executable instructions which, when executed by a computer, cause the computer to execute operations, the operations comprising:
receiving, via a first antenna, a first signal from a reader/writer;
generating a clock frequency higher than a frequency of a carrier wave of contactless communication;
performing, based on the generated clock frequency, a first filter processing on the received first signal;
transmitting, via a second antenna, the received first signal to a contactless communication apparatus based on the first filter processing;
receiving, via the second antenna, a second signal from the contactless communication apparatus;
performing, based on the generated clock frequency, a second filter processing on the received second signal; and transmitting, via the first antenna, the received second signal to the reader/writer based on the second filter process.

\* \* \* \* \*